US012027786B2

(12) United States Patent
Larsen, II et al.

(10) Patent No.: US 12,027,786 B2
(45) Date of Patent: Jul. 2, 2024

(54) MODULAR ANTENNA AND ANTENNA ASSEMBLY

(71) Applicant: Channel Master, LLC, Chandler, AZ (US)

(72) Inventors: Anthony John Larsen, II, Chandler, AZ (US); Jose Ramon Bingochea, II, Chandler, AZ (US)

(73) Assignee: CHANNEL MASTER, LLC, Chandler, AZ (US)

( * ) Notice: Subject to any disclaimer, the term of this patent is extended or adjusted under 35 U.S.C. 154(b) by 0 days.

(21) Appl. No.: 18/083,711

(22) Filed: Dec. 19, 2022

(65) Prior Publication Data

US 2023/0116963 A1 Apr. 20, 2023

Related U.S. Application Data

(63) Continuation of application No. 17/217,613, filed on Mar. 30, 2021, now Pat. No. 11,532,885.

(51) Int. Cl.

*H01Q 5/49* (2015.01)
*H01Q 1/12* (2006.01)
*H01Q 1/22* (2006.01)

(52) U.S. Cl.

CPC ............. *H01Q 5/49* (2015.01); *H01Q 1/1228* (2013.01)

(58) Field of Classification Search

CPC ............................... H01Q 5/49; H01Q 1/1228

See application file for complete search history.

(56) References Cited

U.S. PATENT DOCUMENTS

| | | | | |
|---|---|---|---|---|
| 3,550,144 A * | 12/1970 | Normand | H01Q 11/10 343/815 |
| 3,653,056 A | 3/1972 | Peterson | |
| 3,984,841 A * | 10/1976 | Mikulich, Jr. | H01Q 11/10 343/811 |
| 8,842,053 B1 | 9/2014 | Curtiss et al. | |

* cited by examiner

*Primary Examiner* — Hoang V Nguyen
(74) *Attorney, Agent, or Firm* — Baker Botts L.L.P.

(57) ABSTRACT

An antenna assembly for receiving television signals on both very high frequency (VHF) bands and ultra high frequency (UHF) bands, the antenna assembly including: a main section including an elongated boom, at least one active element coupled to the boom, and at least one passive element coupled to the boom; a VHF section including a VHF boom configured to be coupled to a first longitudinal end of the boom and at least one active element coupled to the VHF boom; and a UHF section including a UHF boom configured to be coupled to a second longitudinal end of the boom opposite the first longitudinal end and a plurality of passive elements coupled to the UHF boom.

20 Claims, 8 Drawing Sheets

MODULAR ANTENNA AND ANTENNA ASSEMBLY

CROSS REFERENCE TO RELATED APPLICATIONS

This application is a continuation of U.S. patent application Ser. No. 17/217,613, filed Mar. 30, 2021, the subject matter of which is incorporated herein by reference.

BACKGROUND

Digital television (DTV) antennas receive over the air broadcast signals in multiple frequency ranges. In general, over the air broadcast includes both very high frequency (VHF) and ultra high frequency (UHF) band channels. The VHF range is from 30 MHz to 300 MHz, while the UHF range is from 300 MHz to 3 GHz. The strength of DTV signals can vary from high in urban areas to low in rural or deep fringe areas. In the context of DTV antennas, it is desirable to provide an antenna that is as small and lightweight as possible while providing efficient reception of the VHF and UHF band channels, and one that is usable in a range of geographic locations associated with varying signal strength.

SUMMARY OF THE INVENTION

One aspect of the invention is directed to an antenna assembly for receiving television signals on both very high frequency (VHF) bands and ultra high frequency (UHF) bands, the antenna assembly comprising: a main section, comprising: an elongated boom; at least one active element coupled to the boom; and at least one passive element coupled to the boom; a VHF section, comprising: a VHF boom configured to be coupled to a first longitudinal end of the boom; and at least one active element coupled to the VHF boom; and a UHF section, comprising: a UHF boom configured to be coupled to a second longitudinal end of the boom opposite the first longitudinal end; and a plurality of passive elements coupled to the UHF boom.

Another aspect of the invention is directed to a main antenna section of a modular antenna for receiving television signals on both VHF bands and ultra high UHF bands, the main antenna section comprising: an elongated boom extending along an axis; at least one active element coupled to the boom and extending in a direction perpendicular to the axis; at least one passive element coupled to the boom and extending in a direction perpendicular to the axis; a first connection interface at a first longitudinal end of the boom, the first connection interface being configured to receive an additional VHF antenna section coupled to the first longitudinal end of the boom; and a second connection interface at a second longitudinal end of the boom opposite the first longitudinal end, the second connection interface being configured to receive an additional UHF antenna section coupled to the second longitudinal end of the boom.

Another aspect of the invention is directed to a modular antenna for receiving television signals on both VHF bands and UHF bands, the modular antenna comprising: a main section, comprising: an elongated boom; at least one active element coupled to the boom; at least one passive element coupled to the boom; a first connection interface at a first longitudinal end of the boom, the first connection interface being configured to receive a first additional antenna section coupled to the first longitudinal end of the boom; and a second connection interface at a second longitudinal end of the boom opposite the first longitudinal end, the second connection interface being configured to receive a second additional antenna section coupled to the second longitudinal end of the boom.

BRIEF DESCRIPTION OF THE DRAWINGS

Various embodiments are described in detail below with reference to the accompanying drawings, wherein like reference numerals represent like elements.

DESCRIPTION OF EMBODIMENTS

DTV antennas are sized and tuned to receive broadcast signals across a VHF/UHF range and having an expected range of signal strengths. For example, a DTV antenna includes an arrangement of active elements (e.g., dipole elements) and passive elements (e.g., director elements, reflector elements) that are sized and spaced relative to each other to receive signals across a VHF/UHF range and at an expected signal strength. However, signal strength can vary across different geographical locations, for example depending on distance from the DTV antenna to a transmission source. In addition, the VHF/UHF band channels to be received by the DTV antenna can vary across different geographical locations, as not all locations offer certain channels (e.g., channels at a low end of the VHF range).

One difficulty in designing DTV antennas is maintaining a small antenna size while providing efficient operation of the antenna for a wide range of geographical locations, since the applicable VHF/UHF ranges and signal strengths can vary significantly with location. An antenna that meets the full range of possible VHF/UHF channels and distances from a transmitter would be quite bulky. Further, such an antenna that meets the full range of possible operations is not needed for a majority of households and businesses.

The inventor recognized these problems and discovered an approach to selectively configure an antenna from a group of modular antenna sections. The antenna sections are selectively combinable in a number of configurations, each configuration designed to provide efficient broadcast reception for certain VHF/UHF ranges and expected signal strengths. The antenna sections include at least a main antenna section that provides efficient broadcast reception across a common VHF/UHF range. The antenna sections may include a VHF antenna section with at least one additional active element to enhance the reception of low VHF channels. The antenna sections may include a UHF antenna section with a plurality of passive elements to increase the sensitivity of the antenna, allowing reception of signals transmitted from farther distances. The main antenna section, selectively configurable antenna assembly, and resulting modular antenna configurations disclosed herein provide increased simplicity and reduced cost for constructing a DTV antenna that operates efficiently at any desired location. The main antenna section, selectively configurable antenna assembly, and resulting modular antenna configurations also reduce the overall size and shipping costs associated with the DTV antenna by tailoring the size and resulting operating range of the antenna to the needs of the location in which the antenna will be used.

Figure 1:
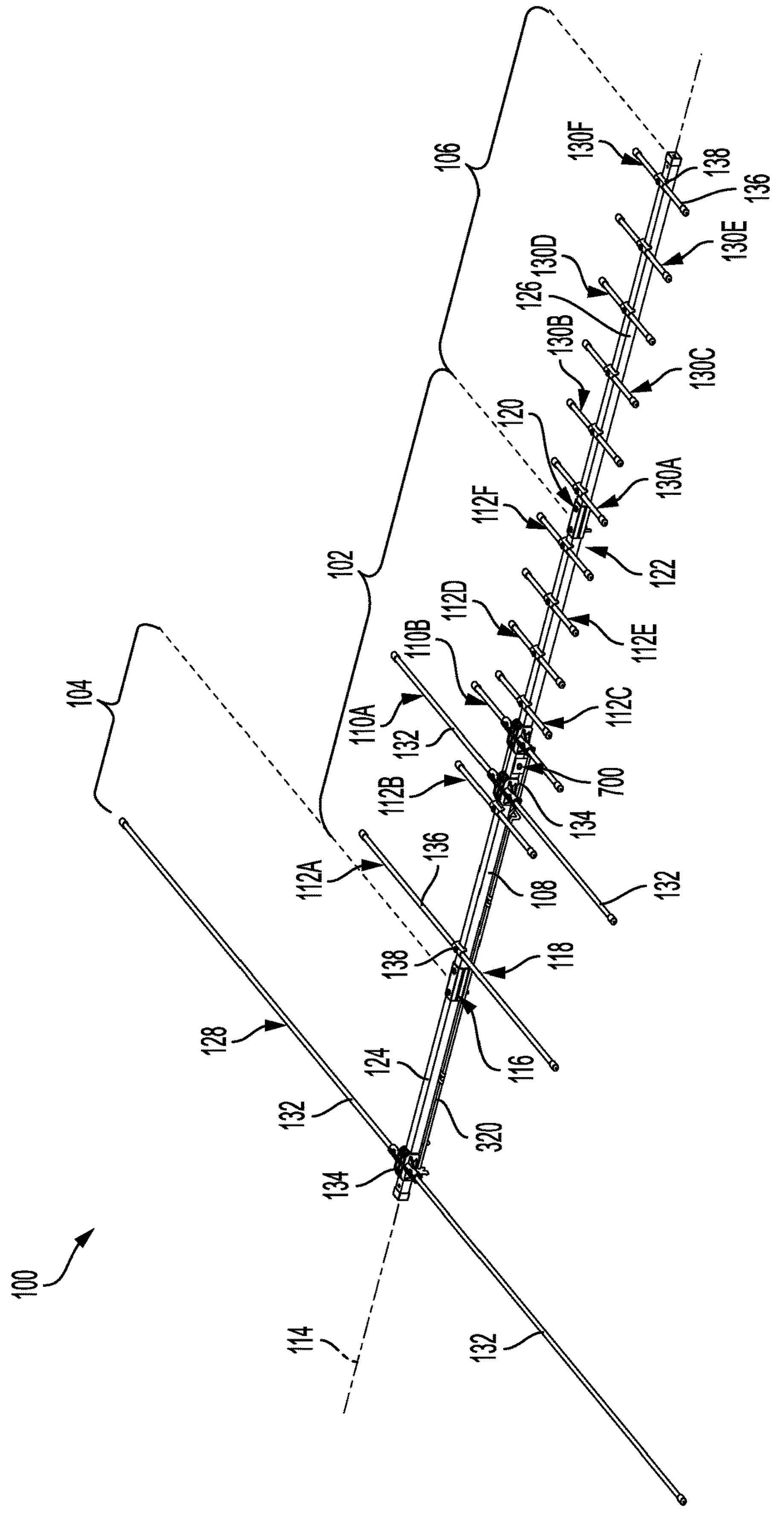
FIG. 1 depicts an example of a modular antenna for receiving television signals on both very high frequency (VHF) bands and ultra high frequency (UHF) bands.

FIG. 1 is a perspective view of an example modular antenna 100. The illustrated modular antenna 100 is fully assembled and includes three modular antenna sections (e.g., 102, 104, and 106) connected end to end. The modular antenna sections include a main section 102, a VHF section 104, and a UHF section 106. The modular antenna 100 is configured to receive television signals on both VHF bands and UHF bands. The modular antenna 100 is a directional antenna extending along a longitudinal axis (axis 114) and having multiple parallel resonant antenna elements arranged in an end-fire array. The antenna elements include active (or driven) elements and passive (or parasitic) antenna elements.

The modular antenna 100 of FIG. 1 comprises the main section 102. The main section 102 comprises an elongated boom 108, at least one active element 110 coupled to the boom 108, and at least one passive element 112 coupled to the boom 108. The boom 108 structurally supports the active and passive elements 110 and 112. The boom 108 may be mounted to an outdoor structure such as a roof via an antenna mount (not shown). The boom 108 is elongated and extends along the longitudinal axis 114 of the modular antenna 100.

The illustrated main section 102 comprises two active elements 110A and 110B coupled to and disposed along the length of the boom 108. Other numbers and arrangements of at least one active element 110 may be included along the length of the boom 108 in other embodiments of the main section 102. The illustrated main section 102 comprises a plurality of passive elements 112 coupled to and disposed along the length of the boom 108. In particular, the illustrated main section 102 comprises six passive elements 112A, 112B, 112C, 112D, 112E, and 112F. Other numbers and arrangements of at least one passive element 112 may be included along the length of the boom 108 in other embodiments of the main section 102. As described below, the exact number, relative size, function, spacing, and arrangement of the active elements 110 and passive elements 112 on the main section 102 may be chosen to provide a desired frequency response to broadcast signals within a VHF/UHF range.

The main section 102 may further comprise a first connection interface 116 at a first longitudinal end 118 of the boom 108 and a second connection interface 120 at a second longitudinal end 122 of the boom 108 opposite to the first longitudinal end 118. As illustrated, the VHF section 104 comprises a VHF boom 124 coupled to the first longitudinal end 118 of the boom 108 via the first connection interface 116. As illustrated, the UHF section 106 comprises a UHF boom 126 coupled to the second longitudinal end 122 of the boom 108 via the second connection interface 120. The VHF boom 124 and/or UHF boom 126 coupled to the boom 108 of the main section 102 extends the overall boom length of a final assembled antenna.

The VHF section 104, when operably connected to the main section 102, may enhance or allow the reception of signals in low VHF band channels that otherwise would not be possible using the main section 102 alone. The "low VHF band channels" may include signals transmitted in a VHF range of approximately 54 MHz to 88 MHz. The "low VHF band channels" may correspond to broadcast television channels 2-6, for example. The "low VHF band channels" may be channels that are available only in broadcast television markets corresponding to certain geographic locations. These geographic locations may represent a smaller subset of all available geographic locations in which the modular antenna is to be used. The VHF section 104 is an optional addition to the main section 102. Whereas the main section 102 may efficiently receive broadcast signals within the channel bands excluding the "low VHF band channels," it may be desirable to configure the modular antenna 100 with the VHF section 104 added to the first longitudinal end 118 of the boom 108 when the modular antenna 100 is to be used in a location where broadcast signals are transmitted in "low VHF band channels."

As illustrated, the VHF section 104 may comprise at least one active element 128 coupled to and disposed along the VHF boom 124. As illustrated, the VHF section 104 does not include any passive elements. In the illustrated embodiment, the modular antenna 100 includes three active elements 110A, 110B, and 128 total, two (110A and 110B) on the main section 102 and one (128) on the VHF section 104. As illustrated, the active element 128 of the VHF section 104 may be substantially greater in length than each of the active elements 110 of the main section 102. The extended length of the active element 128 on the VHF section 104 of the antenna 100 increases the overall size, and therefore cost of shipping, of the modular antenna 100 compared to an antenna that does not include a third active element 128. As such, the modularity of the antenna 100 helps to reduce costs associated with manufacturing and transporting the antenna 100 to a customer, since the third active element 128 with its larger size need only be provided to customers needing reception of "low VHF band channels."

The UHF section 106, when operably connected to the main section 102, may improve the reception of all UHF signals being transmitted from a long distance, as compared to the main section 102 alone. The "long distance" may include distances in a range of approximately 70 miles (113 km) to 100 miles (161 km) from the location in which the modular antenna 100 is operating. The "long distance" may be a result of the antenna being located in a rural, distant, or "deep fringe" area of transmission. Such antenna locations correspond to a smaller subset of all available geographic locations in which the modular antenna is to be used. The UHF section 106 is an optional addition to the main section 102. Whereas the main section 102 may efficiently receive broadcast signals transmitted from short or medium distances (corresponding to, for example, urban or suburban regions), it may be desirable to configure the modular antenna 100 with the UHF section 106 added to the second longitudinal end 122 of the boom 108 when the modular antenna 100 is to be used in a location where broadcast signals are transmitted from a "long distance."

As illustrated, the UHF section 106 may comprise a plurality of passive elements 130 coupled to and disposed along the UHF boom 126. As illustrated, the UHF section 106 does not include any active elements. In the illustrated embodiment, the UHF section 106 includes six passive elements 130A, 130B, 130C, 130D, 130E, and 130F. Different numbers and arrangements of passive elements 130 on the UHF section 106 may be used in other embodiments. The passive elements 130 of the UHF section 106 may each have approximately the same length as the passive elements 112C, 112D, 112E, and 112F proximate the second longitudinal end 122 of the boom 108 in the main section 102. As illustrated, the passive elements 130 in the UHF section 106 may be arranged substantially equidistant (e.g., within +/−5% in distance) from each other along the length of the UHF boom 126. As illustrated, the passive elements 112C, 112D, 112E, and 112F may be arranged substantially equidistant from each other and from the adjacent passive element 130A of the UHF section 106. Each of the passive elements 112C, 112D, 112E, 112F, 130A, 130B, 130C, 130D, 130E, and 130F may function as reflectors in the modular antenna 100 of FIG. 1. The final group of reflectors on the antenna 100 (passive elements 130 on the UHF section 106) increases the overall size, and therefore cost of shipping, of the modular antenna 100 compared to an antenna that does not include this group of passive elements 130. As such, the modularity of the antenna 100 helps to reduce costs associated with manufacturing and transporting the antenna 100 to a customer, since this group of passive elements 130 need only be provided to customers needing broadcast reception from a "long distance."

In some embodiments, the modular antenna 100 includes the main section 102, the VHF section 104, and the UHF section 106. The main section 102 includes at least one active element 110 and at least one passive element 112. The VHF section 104 includes at least one active element 128 but includes no passive elements. The UHF section 106 includes at least one passive element 130 but includes no active elements.

Each active element (e.g., 110A, 110B, and 128) of the modular antenna 100 comprises two rods (or tubes) 132 coupled to a corresponding boom of the antenna 100. The corresponding boom for the active elements 110 on the main section 102 is the boom 108, while the corresponding boom for the active element 128 on the VHF section 104 is the VHF boom 124. As illustrated, for each active element 110 on the main section 102, the two rods 132 may extend from the boom 108 in opposite directions perpendicular to the longitudinal axis 114. Similarly, for each active element 128 on the VHF section 104, the two rods 132 may extend from the VHF boom 124 in opposite directions perpendicular to the longitudinal axis 114. For each active element (e.g., 110A, 110B, and 128) of the modular antenna, the two rods 132 may be colinear with each other. As illustrated, for each active element (e.g., 110A, 110B, and 128) of the modular antenna, the pair of rods 132 may extend the same distance in opposite directions from the corresponding boom. That is, both rods 132 of the active element 128 are equal lengths, both rods 132 of the active element 110A are equal lengths, and both rods 132 of the active element 110B are equal lengths. As illustrated, the rod lengths may vary between the different active elements (e.g., 110A, 110B, and 128). Each rod 132 may include an end cap on its distal end extending from the corresponding boom.

For each active element (e.g., 110A, 110B, and 128) of the modular antenna 100, the two rods 132 may be coupled to the corresponding boom via an active element mount 134. The active element mount 134 may mount the pair of rods 132 on one side or face (e.g., upper face) of the corresponding boom as shown. However, other placements of the rods 132 with respect to the corresponding boom may be used in other embodiments. As illustrated, the active element mounts 134 for each active element in the modular antenna 100 may have the same general shape, size, arrangement, and construction. In other embodiments, the active element mounts 134 may take different forms between the different antenna sections (102 and 104), between individual mounts 134 on the same antenna section, or both. An example active element mount 134 is described below with respect to FIGS. 5A-5C.

Each passive element (e.g., 112A-112F and 130A-130F) of the modular antenna 100 comprises a single rod (or tube) 136 coupled to a corresponding boom of the antenna 100. The corresponding boom for the passive elements 112 on the main section 102 is the boom 108, while the corresponding boom for the passive elements 130 on the UHF section 106 is the UHF boom 126. As illustrated, for each passive element 112 on the main section 102, the rod 136 may be aligned in a direction perpendicular to the longitudinal axis 114 and extend from opposite sides of the boom 108. Similarly, for each passive element 130 on the UHF section 106, the rod 136 may be aligned in a direction perpendicular to the longitudinal axis 114 and extend from opposite sides of the UHF boom 126. As illustrated, for each passive element (e.g., 112A-112F and 130A-130F) of the modular antenna 100, the rod 136 may extend the same distance in opposite directions from the corresponding boom. As illustrated, the rod lengths may vary between different passive elements (e.g., 112A, 112B, and 112C). Other rod lengths may be substantially equal for different passive elements (e.g., 112C-112F and 130A-130F). Each rod 136 may include end caps on both ends thereof.

For each passive element (e.g., 112A-112F and 130A-130F) of the modular antenna 100, the rod 136 may be coupled to the corresponding boom of the antenna 100 via a passive element mount 138. The passive element mount 138 may mount the rod 136 on one side or face (e.g., upper face) of the corresponding boom as shown. However, other placements of the rod 136 with respect to the corresponding boom may be used in other embodiments. As illustrated, the passive element mounts 138 for each passive element in the modular antenna 100 may have the same general shape, size, arrangement, and construction. In other embodiments, the passive element mounts 138 may take different forms between the different antenna sections (102 and 106), between individual mounts 138 on the same antenna section, or both. An example passive element mount 138 is described below with respect to FIG. 6. Since the active elements 110/128 take a different form than the passive elements 112/130 (i.e., two rods 132 versus one rod 136), the active element mounts 134 may have a different shape, size, arrangement, and/or construction than the passive element mounts 138.

The boom 108, the VHF boom 124, and the UHF boom 126 may have similar cross-sectional shapes (e.g., when viewed from a direction of the longitudinal axis 114). The similar cross sections of the booms (boom 108, VHF boom 124, and UHF boom 126) in each respective antenna section may facilitate simple connections via the first and second connection interfaces 116 and 120. The booms may have different cross sections from each other in other embodiments.

As illustrated, the boom 108, the VHF boom 124, and the UHF boom 126 each have a square cross section. The square cross section may enable the use of standard off-the-shelf parts for the construction of the booms (boom 108, VHF boom 124, and UHF boom 126). In other embodiments, the booms may have different cross sections than the square cross section illustrated in FIG. 1. For example, the booms may have a circular cross section in some embodiments. The booms may have cross sections taking any other desired shape, such as circular, triangular, rectangular, trapezoidal, hexagonal, elliptical, irregular, and so forth. The booms may each be hollow.

The active elements 110/128 and passive elements 112/130 may each have a substantially similar cross-sectional shape (e.g., when viewed from a direction of the longitudinal axis of the element). The active elements 110/128 and passive elements 112/130 may have different cross sections from each other in other embodiments.

As illustrated, the active elements 110/128 and passive elements 112/130 each have a circular cross section. The circular cross section may enable the use of standard off-the-shelf cylindrical rods or tubes for the construction of the active elements 112/128 and passive elements 112/130. In other embodiments, the active elements 110/128 and passive elements 112/130 may have different cross sections than the circular cross section illustrated in FIG. 1. For example, the elements may have cross sections taking any other desired shape, such as square, triangular, rectangular, trapezoidal, hexagonal, elliptical, irregular, and so forth. Changing the cross-sectional shape of the active and/or passive elements may adjust the operation of the modular antenna 100.

The modular antenna 100 may be constructed from a combination of metallic and nonmetallic components. For example, the boom 108, the VHF boom 124, and the UHF boom 126 may be metallic, while each active element mount 134 of the antenna module 100 may be a non-conductive material (e.g., nonmetallic, polymeric, or plastic). The boom 108, VHF boom 124, and UHF boom 126 may specifically be made from aluminum (e.g., powder coated 6063 Aluminum), while the active element mounts 134 may be made from acrylonitrile styrene acrylate (ASA) (e.g., LG ASA LI912 general purpose ASA available from LG Chem Ltd.). In addition, the active elements 110/128 and passive elements 112/130 may be metallic as well. Specifically, the active elements 110/128 and passive elements 112/130 may be made from aluminum (e.g., powder coated 6063 Aluminum). The passive element mounts 138 may be constructed partially or fully of metal, such as steel and/or aluminum (e.g., powder coated galvanized steel and/or powder coated aluminum). End caps on the active elements 110/128 and passive elements 112/130, as well as any end caps on the longitudinal ends of the antenna boom(s) may be constructed from a polymer such as polyvinyl chloride (PVC) (e.g., UV stabilized PVC). All other components of the modular antenna (e.g., extension brackets, balun mount 700, and extension harness 320), which are described below, may be constructed from metal such as steel and/or aluminum (e.g., galvanized steel and/or 6061 solid aluminum). It should be noted that other material constructions may be used for some of these components. At least the active and passive elements and the extension harness may be constructed from metal to promote efficient and effective operation of the antenna module 100.

Figure 2:
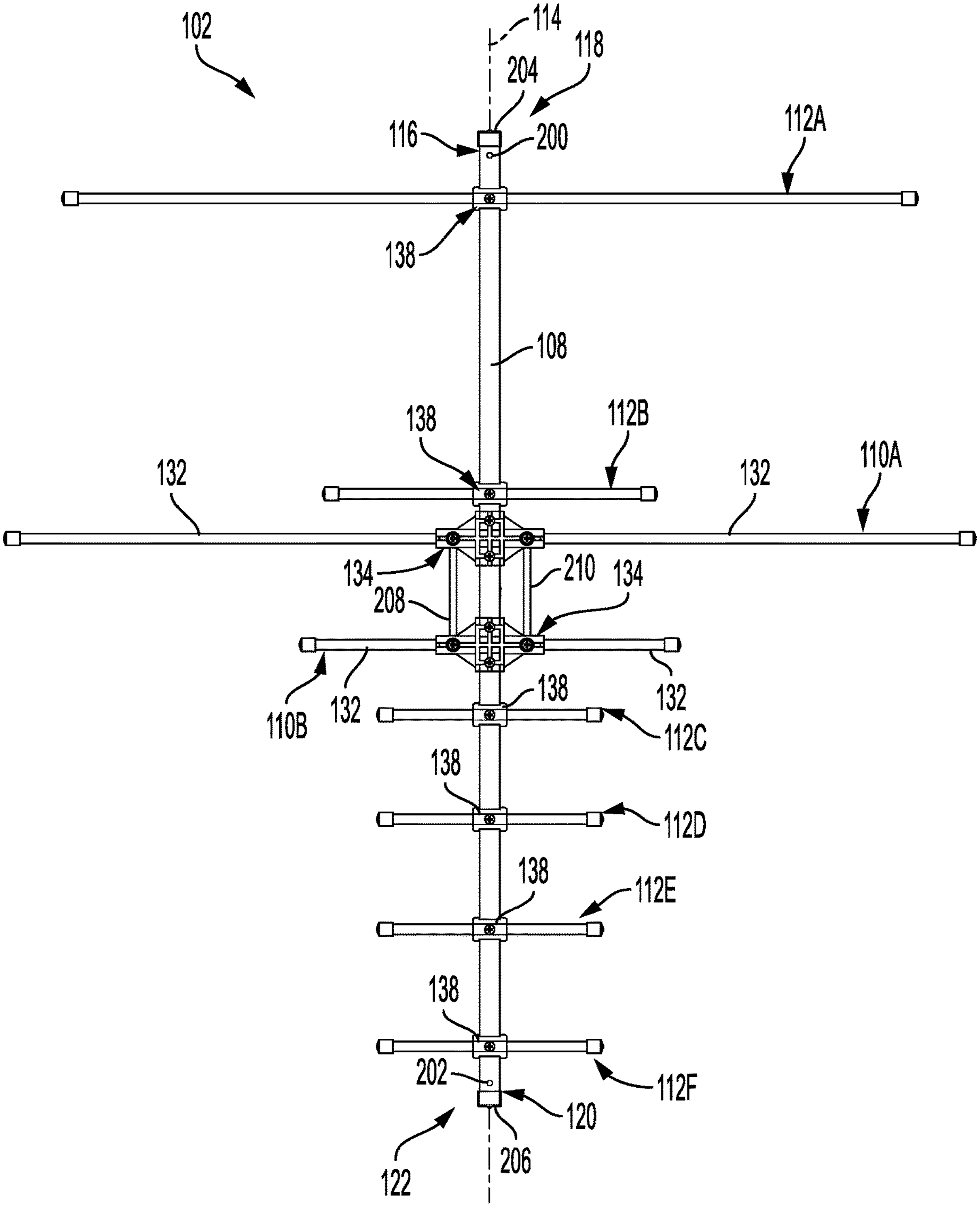
FIG. 2 depicts an example of a main antenna section that can be used alone or with one or more additional antenna sections.

FIG. 2 depicts an example of the main section 102 of FIG. 1 that can be used alone or with one or more additional antenna sections. The main section 102 includes the boom 108, active element(s) 110 coupled to the boom 108 via active element mounts 134, passive element(s) 112 coupled to the boom 108 via passive element mounts 138, and first and second connection interfaces 116 and 120 as described above with reference to FIG. 1. When viewed from above as in FIG. 2, the direction of viewing is perpendicular to the plane formed by the boom 108 and the active/passive elements 110/112 of the main section 102. The boom 108 extends along the longitudinal axis 114, and each active element 110 and each passive element 112 is coupled to the boom 108 and extends in a direction perpendicular to the longitudinal axis 114.

Figure 8:
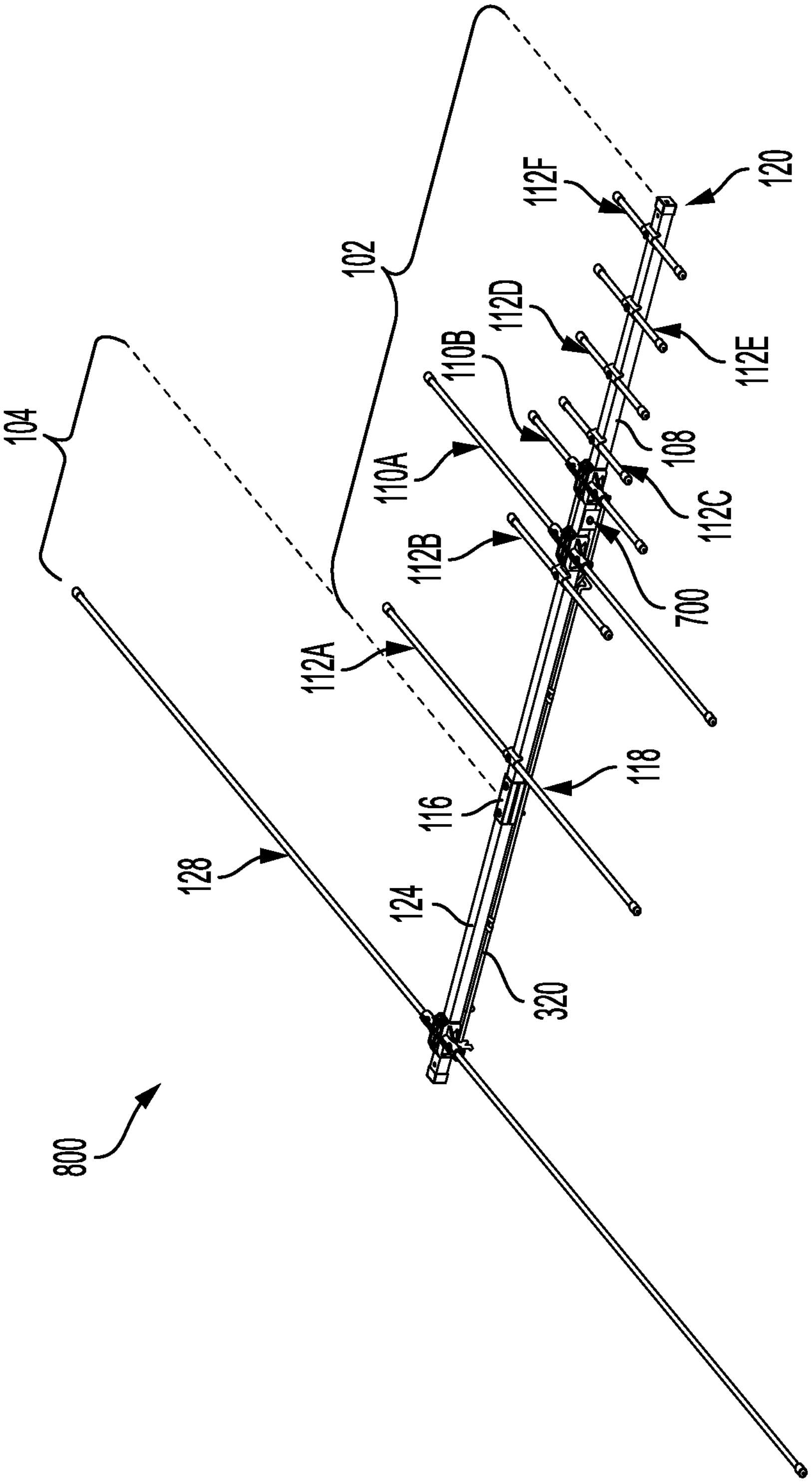
FIG. 8 depicts an example of a modular antenna.
Figure 9:
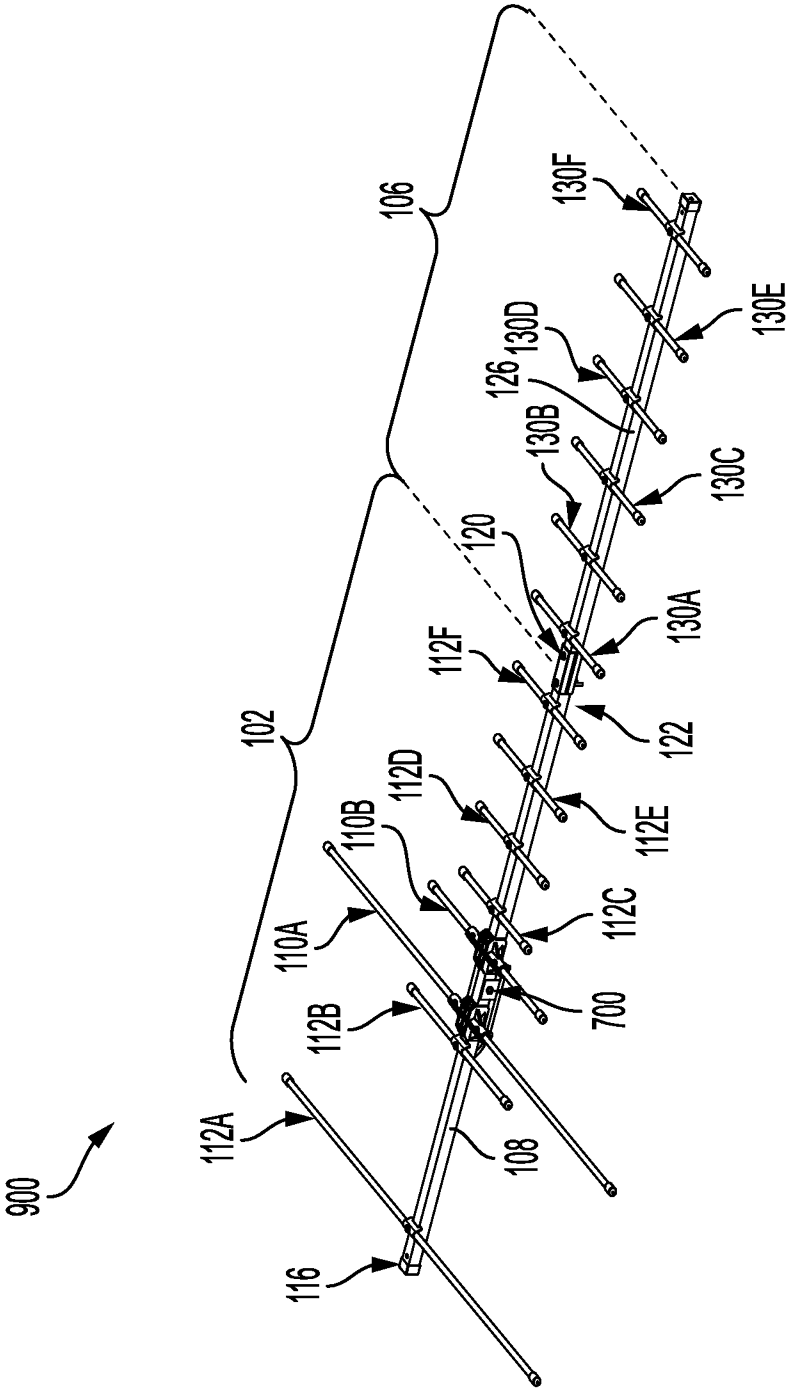
FIG. 9 depicts another example of a modular antenna.

FIG. 2 depicts the main section 102 alone without any extensions (e.g., VHF section 104 or UHF section 106) attached thereto. The main section 102 is configured to function as both a standalone VHF/UHF antenna (without any extensions) and as a base for an extended modular antenna as shown in FIGS. 1, 8, and 9. The main section 102 may be selected for use as a standalone VHF/UHF antenna in instances where no low VHF band channels are needed (i.e., no VHF section) and no boosting of transmission signals is needed (i.e., no UHF section). The main section 102 may thus form a modular antenna for receiving television signals on both VHF bands and UHF bands. Even so, the main section 102 is equipped with connection interfaces 116 and 120 should an additional VHF or UHF section be needed.

The main section 102 comprises a specific number and arrangement of active element(s) 110 and passive element(s) 112 that support its function as both a standalone antenna and as the base module of an extended modular antenna. For example, as illustrated, the main section 102 may include five different lengths of active/passive elements 110/112 coupled to the boom 108. The relative lengths and placements of these active/passive elements 110/112 along the boom 108 are selected to provide an optimum frequency response as predetermined, for example, via simulations. As illustrated, the main section 102 may include one or more passive elements 112 located closest to the first longitudinal end 118 of the boom 108. This differs from existing antenna designs in which an active (or driven) element is typically located closest to the first longitudinal end 118 of the boom 108. The first longitudinal end 118 is the end of the main section 102 designed to face away from incoming broadcast transmissions received by the antenna.

As illustrated, the main section 102 may comprise a first active element 110A and a second active element 110B coupled to the boom 108 at locations adjacent each other, a first passive element 112A coupled to the boom 108 at a location proximate the first longitudinal end 118, a second passive element 112B coupled to the boom 108 at a location between the first passive element 112A and the first active element 110A, and a plurality of passive elements (e.g., 112C-112F) coupled to the boom 108 at locations between the second active element 110B and the second longitudinal end 120. As illustrated, the relative lengths of the active/passive elements 110/112 may be in the following order (from longest to shortest): first active element 110A, first passive element 112A, second active element 110B, second passive element 112B, and finally the additional passive elements 112C-112F. As illustrated, each of the passive elements 112C-112F may have a similar length. The distances between the different active/passive elements 110/112 on the main section 102 may be selected based on simulations as well.

FIG. 2 shows an example of the first connection interface 116 at the first longitudinal end 118 of the boom 108 and the second connection interface 120 at the second longitudinal end 122 of the boom 108. As illustrated, the first connection interface 116 may comprise a first aperture 200 formed in the boom 108 proximate the first longitudinal end 118. The first aperture 200 may facilitate placement of a screw, bolt, anchor, or any other fastener through at least part of the boom 108 to secure a VHF section to the main section 102. As illustrated, the second connection interface 120 may comprise a second aperture 202 formed in the boom 108 proximate the second longitudinal end 122. The second aperture 202 may facilitate placement of a screw, bolt, anchor, or any other fastener through at least part of the boom 108 to secure a UHF section to the main section 102.

The first and second apertures 200 and 202 may each extend through just one outer surface (e.g., upper surface) of the boom 108. This may minimize the likelihood of connections being made incorrectly during a final assembly of the antenna. In other embodiments, the first and second apertures 200 and 202 may each extend through two opposing outer surfaces of the boom 108. This may allow for securing the opposite end of the fastener with a nut. Although the first and second apertures 200 and 202 are shown as being formed in the upper surface of the boom 108, in other embodiments the apertures 200 and 202 may be similarly formed through one or both of side surfaces of the boom 108. In some embodiments, the first aperture 200 may be formed in a first surface of the boom 108, while the aperture 202 is formed in a second surface of the boom 108 (e.g., a surface offset by 90 degrees from the first surface). This may minimize the likelihood of connections being made incorrectly during a final assembly of the antenna.

In addition to the aperture 200, the first connection interface 116 may also include an end cap 204 at the first longitudinal end 118 of the boom 108. Similarly, the second connection interface 120 may include an end cap 206 at the second longitudinal end 122 of the boom 108.

Although apertures 200 and 202 and end caps 204 and 206 are shown in FIG. 2, other embodiments of the main section 102 may include other types of connection interfaces 116 and 120 to facilitate the desired connections, regardless of whether a VHF or UHF section will ultimately be attached to the main section 102 for operation of the antenna.

The main section 102 may comprise two conductor rods 208 and 210 extending between and electrically coupling the first active element 110A to the second active element 110B. The conductor rod 208 may electrically couple a first rod 132 from the first active element 110A with a first rod 132 of the second active element 110B, and the conductor rod 210 may electrically couple the second rod 132 of the first active element 110A with the second rod 132 of the second active element 110B. Electrically coupling the active elements 110A and 110B allows the antenna to appropriately combine signals from the active elements 110A and 110B for communication to a coaxial cable attached to the antenna. The conductor rods 208 and 210 may also provide structural support to the active elements 110A and 110B of the main section 102.

Figure 3:
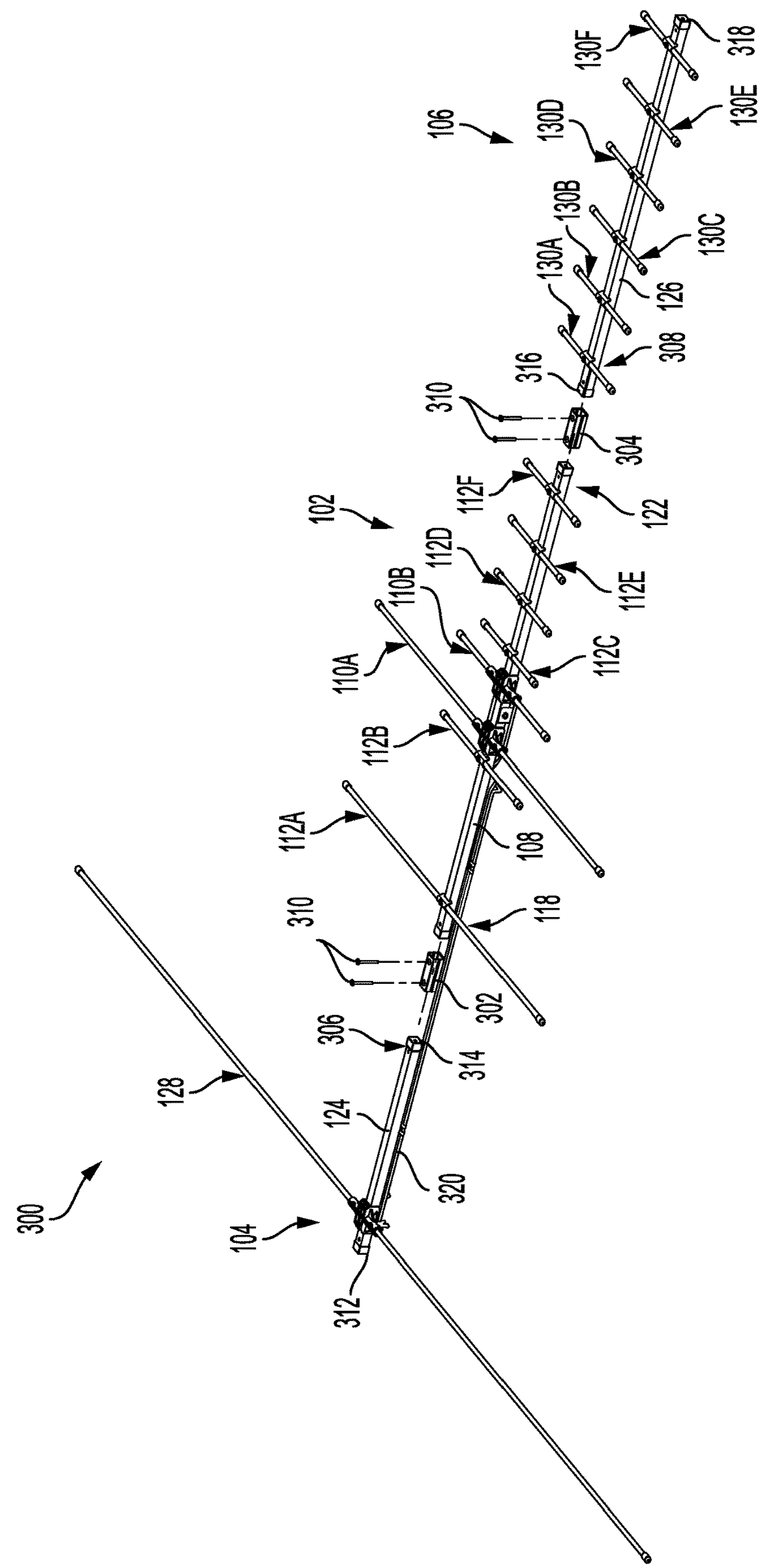
FIG. 3 depicts an example of a modular antenna assembly in an exploded view.

FIG. 3 depicts an example modular antenna assembly 300 in an exploded view. The modular antenna assembly 300 is illustrated in an exploded view showing the components that may be connected together in various combinations to form an antenna for receiving television signals on both VHF bands and UHF bands for a particular location. The modular antenna assembly 300 comprises the main section 102 with the elongated boom 108, at least one active element 110, and at least one passive element 112. The modular antenna assembly 300 further includes the VHF section 104 having the VHF boom 124 and at least one active element 128, and the UHF section 106 having the UHF boom 126 and a plurality of passive elements 130. As illustrated, the VHF boom 124 is configured to be coupled to the first longitudinal end 118 of the boom 108, while the UHF boom 126 is configured to be coupled to the second longitudinal end 122 of the boom 108.

Any desired attachment mechanism may be used in the antenna assembly 300 to couple the VHF boom 124 to the boom 108 or the UHF boom 126 to the boom 108. As illustrated, the antenna assembly 300 may comprise extension brackets 302 and 304 for coupling the VHF section 104 and UHF section 106, respectively, to the main section 102. The first extension bracket 302 is configured to connect the first longitudinal end 118 of the main section 102 to the VHF section 104 while the second extension bracket 304 is configured to connect the second longitudinal end 122 to the UHF section 106. In particular, the extension brackets 302 and 304 may be hollow metal pieces having a similarly shaped but larger cross section than the booms (e.g., 108, 124, and 126). As illustrated, the extension brackets 302 and 304 may be elongated hollow rectangular prisms having openings at opposing longitudinal ends. The open ends may receive the longitudinal ends of the booms between which the extension brackets 302 and 304 are disposed. For example, the first extension bracket 302 may receive a longitudinal end 306 of the VHF boom 124 into one open end and receive the first longitudinal end 118 of the boom 108 into the other open end. The second extension bracket 304 may receive the second longitudinal end 122 of the boom 108 into one open end and receive a longitudinal end 308 of the UHF boom 126 into the other open end. Upon the extension brackets 302 and 304 receiving the different ends of the VHF/UHF sections 104/106 to be added to the main section 102, screws, bolts, anchors, or other fasteners 310 may be secured through apertures in the extension brackets 302 and 304 and corresponding apertures in the connected ends of the booms (e.g., apertures 200 and 202 of FIG. 2, among other apertures). Although all fasteners 310 are illustrated as being received into the top surfaces of the extension brackets 302 and 304, other embodiments may include one or more fasteners 310 being placed through one or more other surfaces of the extension brackets 302 and 304.

As illustrated, the VHF section 104 may comprise end caps 312 and 314 disposed on opposite longitudinal ends of the VHF boom 124. Similarly, the UHF section 106 may comprise end caps 316 and 318 disposed on opposite longitudinal ends of the UHF boom 126. The end caps 314 and 316 may be removed and disposed of prior to assembly of the antenna.

The extension brackets 302 and 304 may enable simple and efficient assembly of a modular antenna using only a screw driver, Allen wrench, or similar tightening mechanism. Depending on the specifications of the final modular antenna, the modular antenna assembly that is shipped to a user may include as few as one component (i.e., just the main section 102), five components (i.e., main section 102, VHF section 104, UHF section 106, extension brackets 302 and 304) excluding the fasteners, or more if active/passive elements need to be attached to the boom(s).

Although the extension brackets 302 and 304 and fasteners are illustrated in FIG. 3, other embodiments of the modular antenna assembly 300 may utilize different types of connections to secure one or both ends of the main section 102 to corresponding VHF or UHF sections 104/106. Other types of connections may include, for example, a threaded connection, an indentation received in a groove, a spring-loaded feature, a lock ring, a rotatable latch or cam mechanism, an expandable component, a high friction surface, or an adhesive. In any event, the main section 102 includes at least some type of connection interface 116 and connection interface 120 configured to facilitate any desired connections.

As illustrated in FIG. 3, the VHF section 104 may comprise an extension harness 320 configured to connect the at least one active element 128 of the VHF section 104 with at least one active element (e.g., 110A) of the main section 102. Prior to the final assembly of the modular antenna, the extension harness 320 may be part of the VHF section 104 as shown. That way, the extension harness 320 is only manufactured for modular antennas in which the harness 320 will be used.

In some embodiments, the modular antenna 100 includes the main section 102, the VHF section 104, and the UHF section 106. The main section 102 includes a first longitudinal end 118 configured to removably couple the main section 102 with the VHF section 104. The VHF section 104 includes a longitudinal end 306 configured to removably couple the VHF section 104 with the main section 102. The main section 102 includes a second longitudinal end 122 configured to removably couple the main section 102 with the UHF section 106. The UHF section 106 includes a longitudinal end 308 configured to removably couple the UHF section 106 with the main section 102.

Figure 4:
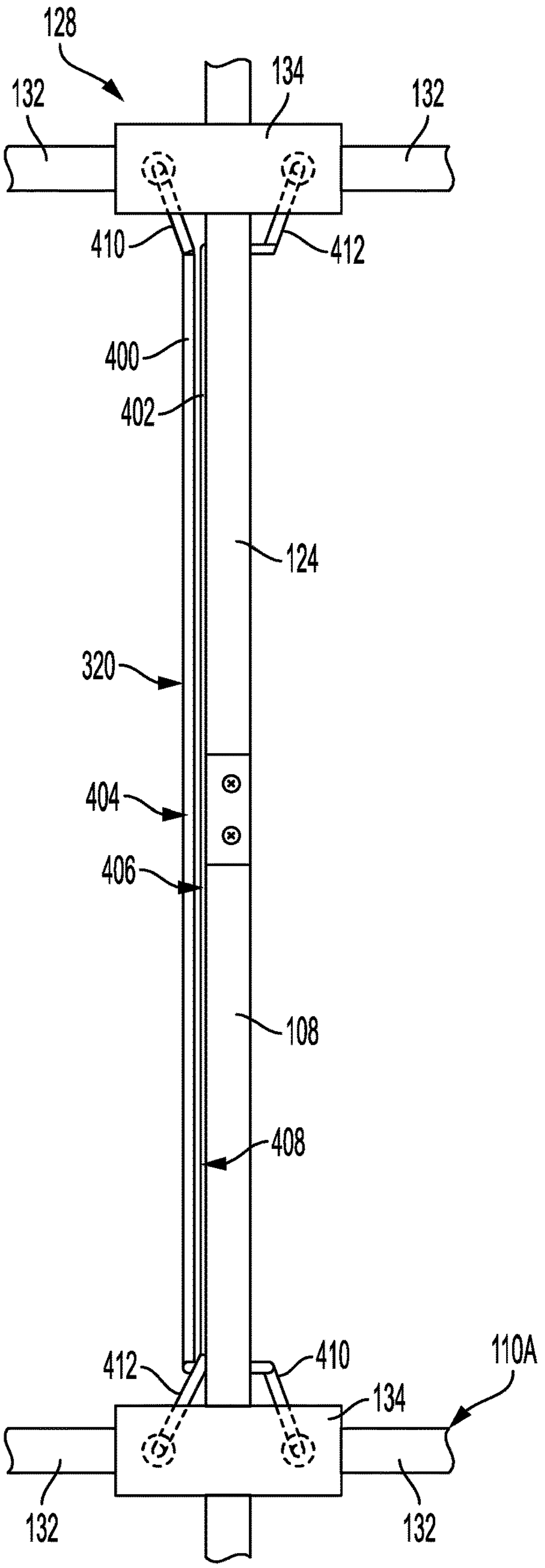
FIG. 4 depicts an example of the structure of an extension harness.

FIG. 4 depicts an example of the extension harness 320 included on the VHF section 104. The extension harness 320 may comprise two elongated conductor rods 400 and 402. When the VHF section 104 is attached to the main section 102, the conductor rods 400 and 402 may extend between and electrically couple the active element 128 on the VHF section 104 to at least one active element 110 of the main section 102. For example, the conductor rod 400 may be used in the assembly of FIG. 3 to electrically couple a first rod from the active element 128 of the VHF section 104 with a first rod of the first active element 110A of the main section 102. Likewise, the conductor rod 402 may be used in the same assembly to electrically couple a second rod from the active element 128 with a second rod of the first active element 110A. Electrically coupling the active elements 128 and 110A allows the antenna to combine signals from all active elements (e.g., 110A, 110B, and 128) for communication to a coaxial cable attached to the antenna. The conductor rods 400 and 402 may also provide structural support to the connection between the VHF section 104 and the main section 102.

As illustrated, the extension harness 320 may have a shape and arrangement that facilitates simple assembly of the modular antenna and attachment of the antenna to an outdoor structure. The conductor rod 400 may comprise an elongated portion 404, and the conductor rod 402 may also comprise an elongated portion 406. Both elongated portions 404 and 406 of the conductor rods 400 and 402 are disposed adjacent to and extend along the same side 408 of the VHF boom 124 and the boom 108. This is unlike the conductors 208 and 210 of the main section 102, which as shown in FIG. 2 may extend one along each side of the boom 108. The relative placement of the extension harness conductor rods 400 and 402 along the side of the booms provides structural support and electrical coupling between the active elements without impeding the attachment of a mounting bracket (not shown) to one or both booms. The mounting bracket may be a C-shaped clamp mechanism that clamps to one or both booms (108/124) to mount the antenna to a roof or other outdoor structure.

As illustrated, in addition to the elongated portions 404 and 406, the conductor rods 400 and 402 may comprise bent portions 410 and 412 at their respective ends. The bent portions 410 and 412 may weave the ends of the conductor rods 400 and 402 around each other so that appropriate connections can be made to the active elements 128 and 110A without the conductor rods 400 and 402 touching each other and while keeping the elongated portions 404 and 406 on the same side 408 of the booms.

As illustrated, the bent portions 410 and 412 may criss-cross one another without touching at one end of the conductor rods 400 and 402. In the illustrated embodiment, the bent portions 410 and 412 criss-cross one another at a lower end proximate the active element 110A attached to the boom 108. In another embodiment, the bent portions 410 and 412 may criss-cross at the upper end proximate the active element 128 attached to the VHF boom 124. The conductor rods 400 and 402 may criss-cross each other at an end of the two conductor rods 400 and 402 proximate an end of the elongated portions 404 and 406. The conductor rods 400 and 402 may criss-cross each other on the same side 408 of the boom 108 (or the VHF boom 124) along which the elongated portions 404 and 406 extend.

It is desired for the conductor rods 400 and 402 to criss-cross each other at some point along their length to provide a connection (e.g., via 400) between a rod 132 on a first side (e.g., left side) of the active element 128 and a rod 132 on a second side (e.g., right side) of the active element 110A, wherein the first side is opposite the second side. Similarly, the criss-crossing of the conductor rods 400 and 402 may provide a connection (e.g., via 402) between a rod 132 on the second side (e.g., right side) of the active element 128 and a rod 132 on the first side (e.g., left side) of the active element 110A. Having the conductor rods 400 and 402 criss-cross each other at one end of the conductor rods 400 and 402 (e.g., at the bent portions) may help to provide the desired electrical connections for the conductor rods 400 and 402 while keeping the elongated portions 404 and 406 on the same side 408 of the booms to avoid the mounting bracket (not shown) to one or both booms 108/124. Additional supports made of non-conductive material may be used to support the conductor rods 400 and 402 and/or separate the conductor rods 400 and 402 from each other and/or from the booms 108 and 124.

Figure 5A:
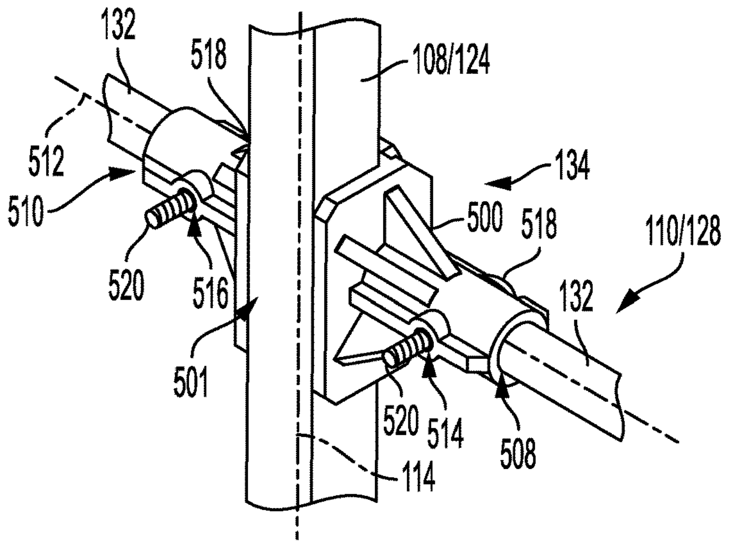
FIGS. 5A, 5B, and 5C depict an example of the structure of an active element mount of a modular antenna.
Figure 5B:
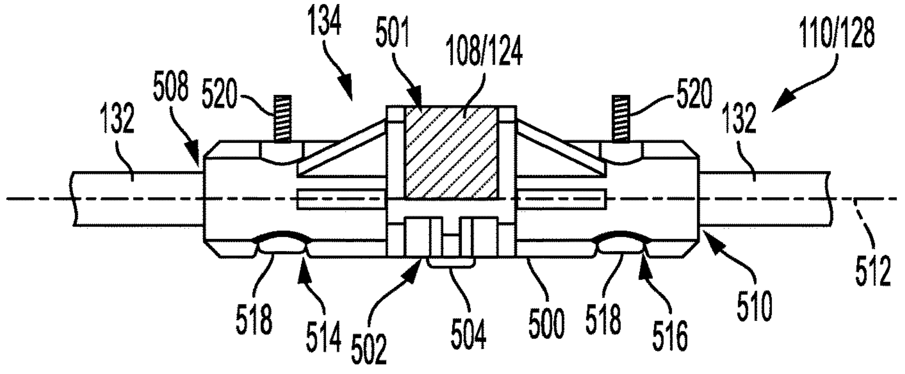
Figure 5C:
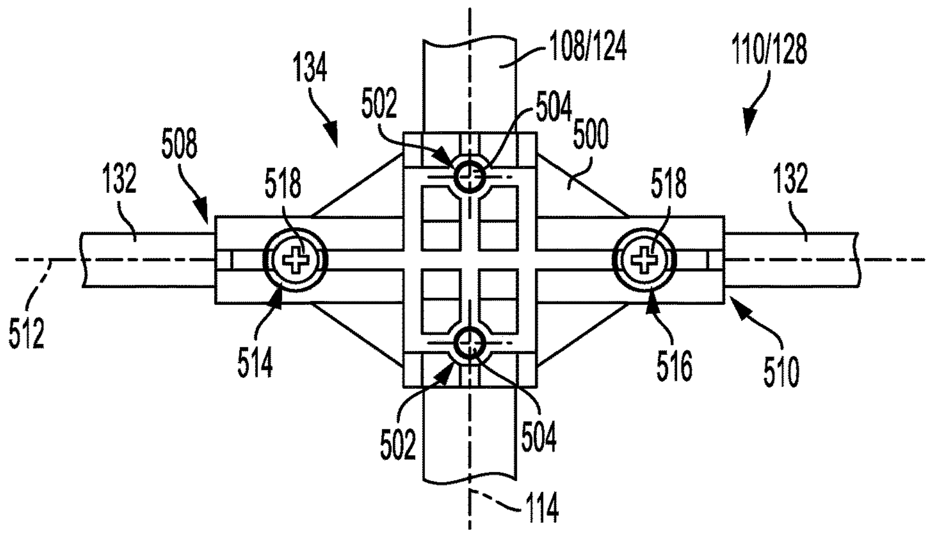

FIGS. 5A-5C depict an example of the active element mount 134 used to couple an active element (e.g., 110/128) to the corresponding boom (e.g., 108/124). As illustrated, the active element mount 134 may include a single body coupled between the boom 108/124 and both rods 132 of the active element 110/128 being attached to the boom 108/124. The active element mount 134 may comprise a U-shaped bracket 500 positioned around and fastened to the boom 108/124. The U-shape of the active element 134 provides a large slot 501 in the active element mount 134 that can be positioned around the boom 108/124. The U-shaped bracket 500 may comprise one or more apertures 502 extending through a surface of the U-shaped bracket 500, each aperture 502 being aligned with the slot 501 and configured to receive fasteners 504 for mounting the active element mount 134 in a desired position along the length of the boom 108/124. The fasteners 504 may be received through the one or more apertures 502 in the U-shaped bracket 500 and through at least one surface of the boom 108/124.

The U-shaped bracket 500 may comprise two antenna openings 508 and 510 on opposite sides thereof. The openings 508 and 510 each hold one of the two rods 132 of the active element 110/128. As illustrated, the openings 508 and 510 may be cylindrical openings to receive rods 132 having a rounded cross section. The openings 508 and 510 face opposite directions, and the openings 508 and 510 are oriented along an axis 512 that is perpendicular to the longitudinal axis 114.

The U-shaped bracket 500 may comprise an aperture 514 through a surface of the U-shaped bracket 500 and aligned at least partially with the first antenna opening 508, and an aperture 516 through a surface of the U-shaped bracket 500 and aligned at least partially with the second antenna opening 510. As illustrated, the apertures 514 and 516 may each extend entirely through the U-shaped bracket 500, allowing a fastener 518 such as a screw, bolt, anchor, etc. to extend through the U-shaped bracket 500 and the rod 132 positioned in the corresponding opening. The fasteners 518 may secure the rods 132 within the corresponding openings 508 and 510 of the U-shaped bracket 500. As illustrated, the fasteners 504 and 518 may each extend through the U-shaped bracket 500 in a direction perpendicular to the longitudinal axis 114 of the antenna and perpendicular to the axis 512 of the antenna openings 508 and 510.

A tail end 520 of each fastener 518 may protrude from a surface of the U-shaped bracket 500 at the apertures 514 and 516. This allows additional components to be threaded or otherwise attached to the tail end 520 of the fastener 518. For example, conductor rods (e.g., 208, 210, 400, or 402) may be attached and secured via wingnuts to the tail end 520 of these fasteners 518, thereby providing a mechanical and electrical coupling between different active elements 110/128 as described above with reference to FIGS. 2 and 4.

The active element mount 134 may be constructed from a non-conductive material. The active element mount 134 may be a single body constructed from acrylonitrile styrene acrylate (ASA) (e.g., LG ASA LI912 general purpose ASA available from LG Chem Ltd.). The active element mount 134 may be injection molded. The active element mount 134 may include ribbing on one or more surfaces thereof to reduce the weight and to increase structural support of the active element mount 134. The active element mount 134 may provide increased structure to the modular antenna, making the modular antenna sturdy and robust.

Figure 6:
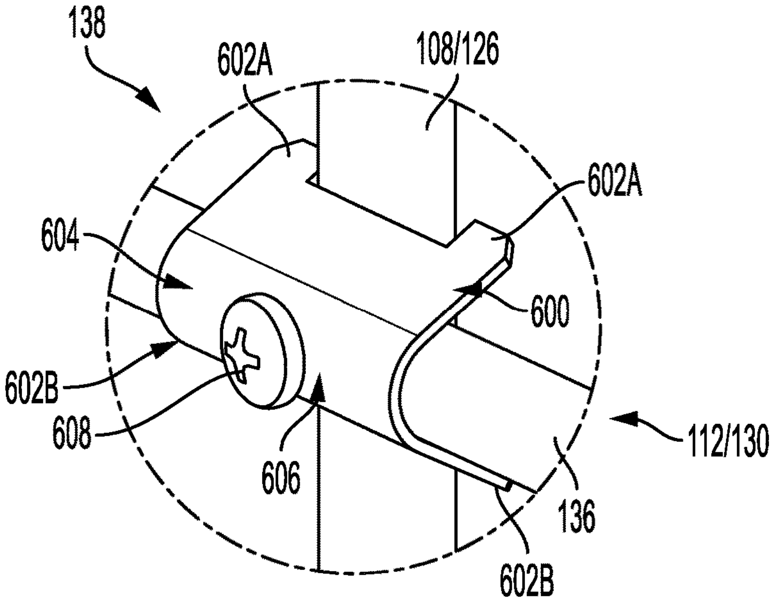
FIG. 6 depicts an example of the structure of a passive element mount of a modular antenna.

FIG. 6 depicts an example of the passive element mount 138 used to couple a passive element (e.g., 112/130) to the corresponding boom (e.g., 108/126). As illustrated, the passive element mount 138 may include a single body coupled to both the boom 108/126 and the single rod 136 of the passive element 112/130. The passive element mount 138 may comprise a bracket 600 having arms 602 that extend around opposite sides of the boom 108/126 and a rounded surface 604 shaped to fit over the rod 136 of the passive element 112/130. The bracket 600 may include a first pair of arms 602A disposed on opposite sides of the boom 108/126, a second pair of arms 602B disposed on opposite sides of the boom 108/126, and the rounded surface 604 disposed between the first pair of arms 602A and the second pair of arms 602B. Other shapes of the bracket 600 may be used in other embodiments. The bracket 600 may include an aperture 606 formed therethrough, and a fastener 608 may extend through the aperture 606 to secure the bracket 600 and the rod 136 to the boom 108/126. The fastener 608 may extend through the rounded surface 604 of the bracket 600, through the rod 136, and into the boom 108/126. The bracket 600 may be a single piece of solid material. The bracket 600 may be made of metal such as steel and/or aluminum (e.g., powder coated galvanized steel and/or powder coated aluminum). The arms 602 of the bracket 600 increase the stiffness and stability of the bracket 600 holding the rod 136 against the boom 108/126. Thus, the illustrated bracket 600 provides a sturdy and robust mechanism for holding passive elements 112/130 in place along the boom 108/126.

Figure 7A:
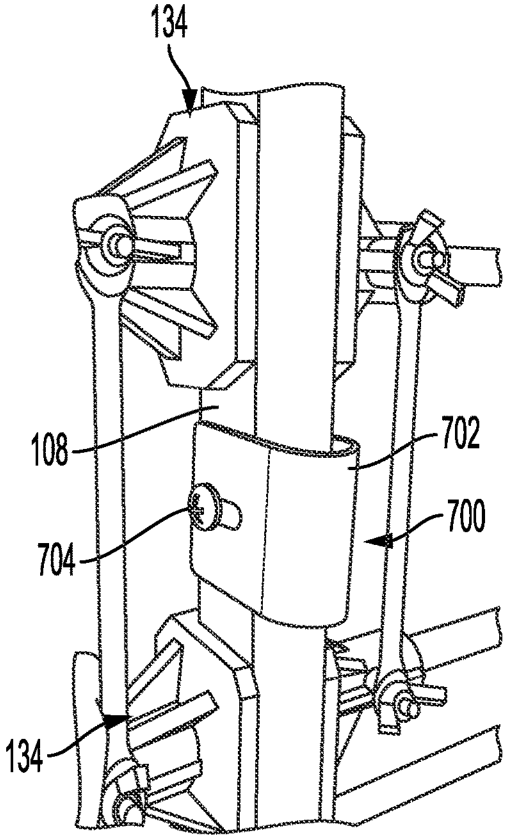
FIGS. 7A and 7B depict an example of the structure of a balun mount of a modular antenna.
Figure 7B:
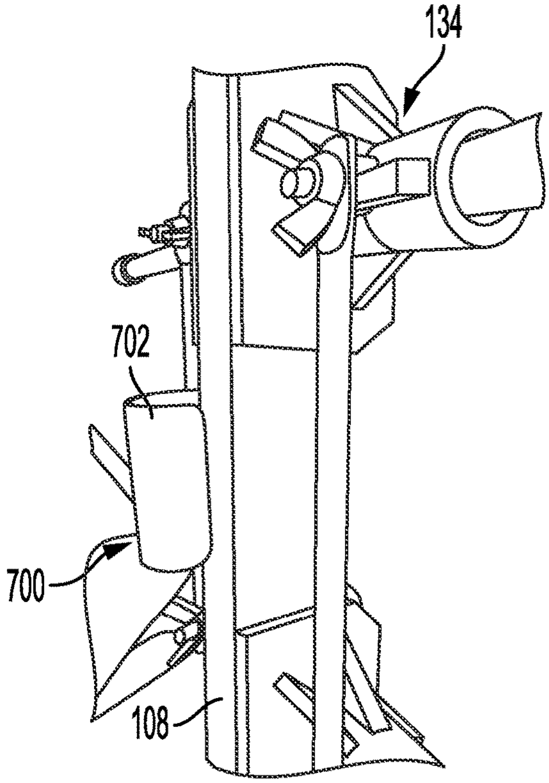

FIGS. 7A and 7B depict an example of the structure of a balun mount of a modular antenna. The main section 102 of the modular antenna, as shown in FIG. 1, may include a balun mount in some embodiments. FIGS. 7A and 7B depict an example balun mount 700 coupled to the boom 108 of the main section 102. As illustrated, the balun mount 700 may be coupled to the boom 108 at a position between the active element mounts 134 used to mount two active elements 110A and 110B to the boom 108. The balun mount 700 may be disposed at other longitudinal locations along the boom 108 in other embodiments. The balun mount 700 may be coupled to the UHF or VHF sections in other embodiments. However, it may be desirable for the balun mount 700 to be positioned on the boom 108 of the main section 102, since this provides easy access for connecting a balun to the active elements 110 of the main section 102.

The balun mount 700 is configured to mount a balun (not shown) to the modular antenna. A balun is communicatively coupled between the active element(s) of the antenna and a coaxial cable output to convert between impedances of these components. The balun is a separate component from the modular antenna. If the balun becomes damaged during antenna operation, the balun may simply be removed from the modular antenna and replaced without requiring replacement of the entire antenna or even one section of the modular antenna. The balun mount 700 may be coupled directly to the boom 108 to provide a secure method for removably attaching the balun to the modular antenna. As illustrated, the balun mount 700 may comprise a J-shaped bracket connected to the boom 108. The J-shaped bracket may provide a hook 702 over which the balun may be placed and secured. The J-shaped bracket may be secured to the boom 108 via a fastener 704 such as a screw, bolt, or anchor.

FIG. 8 depicts an example modular antenna 800 including the main section 102 and the VHF section 104 coupled together. The modular antenna 800 is operable for receiving television signals on both VHF bands and UHF bands. The modular antenna 800 comprises the main section 102 having an elongated boom 108, at least one active element 110 coupled to the boom 108, and at least one passive element 112 coupled to the boom 108. The main section 102 further includes the first connection interface 116 and second connection interface 120 at opposite longitudinal ends of the boom 108. The modular antenna 800 of FIG. 8 also comprises the VHF section 104 having a VHF boom 124 coupled to the first longitudinal end 118 of the boom 108 via the first connection interface 116 and at least one active element 128 coupled to the VHF boom 124. As illustrated, the modular antenna 800 comprises the extension harness 320 coupling the active element 28 of the VHF section 104 to at least the active element 110A of the main section 102. The VHF section 104 may enable the reception of low VHF channels.

FIG. 9 depicts an example modular antenna 900 including the main section 102 and the UHF section 106 coupled together. The modular antenna 900 is operable for receiving television signals on both VHF bands and UHF bands. The modular antenna 900 comprises the main section 102 having an elongated boom 108, at least one active element 110 coupled to the boom 108, and at least one passive element 112 coupled to the boom 108. The main section 102 further includes the first connection interface 116 and second connection interface 120 at opposite longitudinal ends of the boom 108. The modular antenna 900 of FIG. 9 also comprises the UHF section 106 having a UHF boom 126 coupled to the second longitudinal end 122 of the boom 108 via the second connection interface 120 and a plurality of passive elements 130 coupled to the UHF boom 126. The UHF section 106 may increase the sensitivity of the modular antenna 900, allowing reception of signals transmitted from farther distances.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A modular antenna for receiving television signals, the modular antenna comprising:

a first section comprising:

an elongated boom extending along an axis;

at least one active element coupled to the elongated boom and extending in a direction perpendicular to the axis;

at least one passive element coupled to the elongated boom and extending in a direction perpendicular to the axis;

a first connection interface at a first longitudinal end of the elongated boom, the first connection interface being configured to receive a second section comprising at least one second active element;

a second connection interface at a second longitudinal end of the elongated boom, the second connection interface being configured to receive a third section; and an extension harness configured to connect the at least one second active element of the second section to the at least one active element of the first section;

wherein the at least one active element is configured for receiving television signals in at least one of a very-high frequency (VHF) range or an ultra-high frequency (UHF) range, and wherein at least the second section is configured to receive television signals in the VHF range.

2. The modular antenna of claim 1, wherein the first section comprises two active elements coupled to the elongated boom and a plurality of passive elements coupled to the elongated boom.

3. The modular antenna of claim 1, wherein the second section comprises the at least one second active element coupled to a VHF boom.

4. The modular antenna of claim 3, wherein the elongated boom and the VHF boom each have a square cross section.

5. The modular antenna of claim 1, wherein the third section comprises at least one passive element coupled to a UHF boom.

6. The modular antenna of claim 5, wherein the elongated boom and the UHF boom each have a square cross section.

7. The modular antenna of claim 1, wherein the at least one active element of the first section or the at least one passive element of the first section has a circular cross section.

8. The modular antenna of claim 1, wherein the at least one active element of the first section comprises two rods coupled to the elongated boom via an active element mount.

9. The modular antenna of claim 8, wherein the elongated boom is metallic, and the at least one active element is mounted to the elongated boom using a nonmetallic mount.

10. The modular antenna of claim 9, wherein the nonmetallic mount comprises:

a U-shaped bracket positioned around and fastened to the elongated boom;

wherein the U-shaped bracket comprises two antenna element openings each holding one of the two rods of the at least one active element.

11. The modular antenna of claim 1, further comprising:

a first extension bracket configured to connect the first longitudinal end of the first section to the second section; and a second extension bracket configured to connect the second longitudinal end of the first section to the second section.

12. A modular antenna for receiving television signals, the modular antenna comprising:

a first section comprising:

an elongated boom extending along an axis;

at least one active element coupled to the elongated boom and extending in a direction perpendicular to the axis;

at least one passive element coupled to the elongated boom and extending in a direction perpendicular to the axis;

a first connection interface at a first longitudinal end of the elongated boom, the first connection interface being configured to receive a second section, wherein the second section includes at least one second active element and is configured to receive television signals in a very high frequency (VHF) range; and an extension harness configured to connect the at least one second active element of the second section to the at least one active element of the first section.

13. The modular antenna of claim 12, wherein the extension harness comprises:

two conductor rods, each conductor rod being electrically coupled to and extending between a corresponding side of the at least one active element of the first section and a corresponding side of the at least one second active element of the second section.

14. The modular antenna of claim 13, wherein each of the two conductor rods comprises an elongated portion, and wherein the elongated portions of the two conductor rods both extend along a same side of the elongated boom.

15. The modular antenna of claim 14, wherein the two conductor rods crisscross each other at an end of the two conductor rods proximate an end of the elongated portions of the two conductor rods.

16. A modular antenna for receiving television signals on at least one of very high frequency (VHF) bands or ultra high frequency (UHF) bands, the modular antenna comprising:

a first section comprising:

an elongated boom extending along an axis;

at least one active element coupled to the elongated boom and extending in a direction perpendicular to the axis;

at least one passive element coupled to the elongated boom and extending in a direction perpendicular to the axis;

a first connection interface at a first longitudinal end of the elongated boom, the first connection interface comprising a first aperture formed in the elongated boom proximate the first longitudinal end and being configured to receive a second section which includes at least one second active element and is configured to receive television signals in a VHF range; and an extension harness configured to connect the at least one second active element of the second section to the at least one active element of the first section.

17. The modular antenna of claim 16, wherein the at least one second active element is coupled to a VHF boom.

18. The modular antenna of claim 16, wherein the first connection interface comprises an extension bracket.

19. The modular antenna of claim 16, further comprising:

a second connection interface at a second longitudinal end of the elongated boom, the second connection interface comprising a first aperture formed in the elongated boom proximate the second longitudinal end and being configured to receive a third section.

20. The modular antenna of claim 19, wherein the third section comprises at least one passive element coupled to a UHF boom.

* * * * *